(12) United States Patent
Gassner et al.

(10) Patent No.: US 12,433,192 B2
(45) Date of Patent: Oct. 7, 2025

(54) SELF-PROPELLED WORK APPARATUS

(71) Applicant: Andreas Stihl AG & Co. KG, Waiblingen (DE)

(72) Inventors: Markus Gassner, Koessen (AT); Robert Kugler, Kufstein (AT); Alberto Bellato, Axams (AT); Christoph Wohlfrom, Heubach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 496 days.

(21) Appl. No.: 18/047,931

(22) Filed: Oct. 19, 2022

(65) Prior Publication Data
US 2023/0157204 A1    May 25, 2023

(30) Foreign Application Priority Data

Nov. 25, 2021   (EP) .................................. 21210473

(51) Int. Cl.
| | | |
|---|---|---|
| *A01D 34/54* | (2006.01) | |
| *A01D 34/00* | (2006.01) | |
| *A01D 34/30* | (2006.01) | |
| *A01D 34/74* | (2006.01) | |
| *A01D 69/06* | (2006.01) | |
| *A01D 101/00* | (2006.01) | |

(52) U.S. Cl.
CPC ........... *A01D 34/008* (2013.01); *A01D 34/30* (2013.01); *A01D 34/74* (2013.01); *A01D 69/06* (2013.01); *A01D 2101/00* (2013.01)

(58) Field of Classification Search
CPC ...... A01D 34/008; A01D 34/30; A01D 34/74; A01D 69/06; A01D 2101/00
See application file for complete search history.

(56) References Cited

U.S. PATENT DOCUMENTS

| | | | |
|---|---|---|---|
| 3,247,654 A | 4/1966 | Nemeth et al. | |
| 10,716,254 B2 * | 7/2020 | Song ................... | A01D 34/008 |
| 11,071,249 B2 * | 7/2021 | Hong ................... | A01D 34/008 |
| 11,129,327 B2 * | 9/2021 | Hong ................... | G01D 5/145 |
| 11,452,255 B2 * | 9/2022 | Umemoto ............ | A01D 34/74 |

(Continued)

FOREIGN PATENT DOCUMENTS

| | | |
|---|---|---|
| CN | 107996124 A | 5/2018 |
| DE | 31 32 478 A1 | 5/1982 |

(Continued)

*Primary Examiner* — Claude J Brown
(74) *Attorney, Agent, or Firm* — Walter Ottesen, P.A.

(57) ABSTRACT

A self-propelled work apparatus, especially a lawnmower, includes a chassis, at least one tool and a drive motor for driving the tool. The tool is height-adjustable with respect to the chassis. A setting unit is provided to set the relative position of the tool with respect to the chassis. The setting unit includes an actuating motor and a setting gear. The setting gear rotates by less than one full revolution between a first, lower end position of the tool and a second, upper end position of the tool. A detection device is provided to detect the height position of the tool. The detection device includes encoding elements on the setting gear and at least one detector. The at least one first encoding element for the first end position differs from the at least one second encoding element for the second end position.

16 Claims, 8 Drawing Sheets

(56) References Cited

U.S. PATENT DOCUMENTS

| | | | |
|---|---|---|---|
| 11,641,797 B2* | 5/2023 | Li | A01D 34/008 |
| | | | 56/17.1 |
| 12,144,283 B2* | 11/2024 | Xu | A01D 69/02 |
| 2016/0278287 A1* | 9/2016 | Kasai | A01D 34/736 |
| 2017/0181375 A1 | 6/2017 | Hashimoto et al. | |
| 2017/0280623 A1* | 10/2017 | Yamamura | A01D 34/008 |
| 2018/0116109 A1* | 5/2018 | Matsumoto | A01D 34/78 |
| 2018/0184585 A1* | 7/2018 | Song | A01D 34/74 |
| 2018/0206402 A1* | 7/2018 | Ran | A01D 34/81 |
| 2018/0235146 A1* | 8/2018 | Hashimoto | A01D 34/81 |
| 2018/0271014 A1* | 9/2018 | Matsuzawa | A01D 34/826 |
| 2019/0216014 A1* | 7/2019 | Hahn | A01D 34/54 |
| 2019/0223376 A1* | 7/2019 | Lee | B25J 13/088 |
| 2020/0170186 A1* | 6/2020 | Curtis | F16H 25/20 |
| 2020/0242861 A1* | 7/2020 | Dobashi | G07C 5/085 |
| 2020/0375091 A1* | 12/2020 | Kuriyagawa | A01D 34/54 |
| 2021/0085143 A1* | 3/2021 | Takahashi | G05D 1/0287 |
| 2022/0137639 A1* | 5/2022 | Kawai | G05D 1/0246 |
| | | | 701/2 |

FOREIGN PATENT DOCUMENTS

| | | | |
|---|---|---|---|
| DE | 10 2019 220 328 A1 | 6/2021 | |
| EP | 3533310 A1 * | 9/2019 | A01D 34/008 |
| WO | 2014/007694 A1 | 1/2014 | |

* cited by examiner

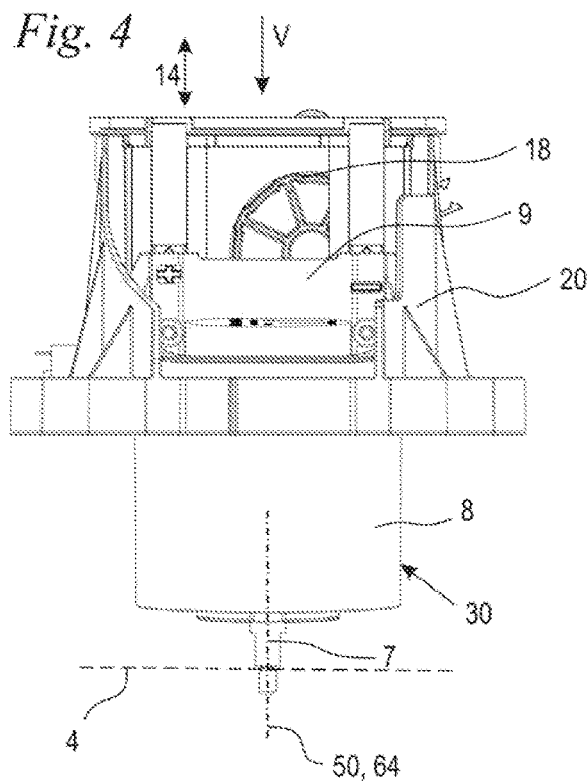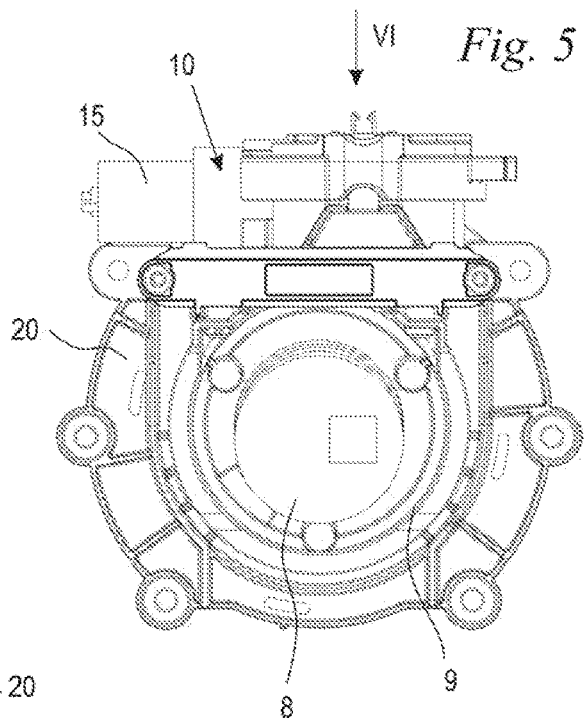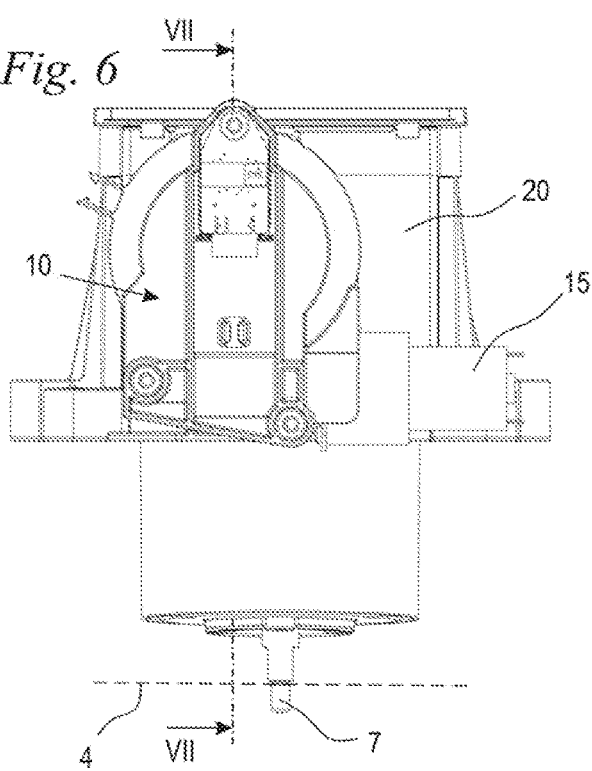

SELF-PROPELLED WORK APPARATUS

CROSS REFERENCE TO RELATED APPLICATION

This application claims priority of European patent application no. 21210473.1, filed Nov. 25, 2021, the entire content of which is incorporated herein by reference.

TECHNICAL FIELD

The disclosure relates to a self-propelled work apparatus having a chassis and at least one tool and with a drive motor for driving the tool. The tool is height-adjustable with respect to the chassis and a setting unit is provided to set the relative position of the tool with respect to the chassis. The setting unit includes an actuating motor and a setting gear. The setting gear rotates by less than one full revolution between a first, lower end position of the tool and a second, upper end position of the tool.

BACKGROUND

CN 107996124 A has disclosed a lawnmower with a setting unit for the tool, which setting unit includes an actuating motor and a setting gear. The setting gear has an eccentric pin which engages into a mount for the motor.

SUMMARY

It is an object of the disclosure to provide a self-propelled work apparatus wherein the position of the tool can be detected in a simple manner.

According to the disclosure, a detection device is provided to detect the height position of the tool. The detection device includes encoding elements on a setting gear and at least one detector. The at least one first encoding element for the first end position differs here from the at least one second encoding element for the second end position.

The encoding elements and detector permit a detection of the height position of the tool in a simple way. By virtue of the fact that the encoding elements for the first end position and for the second end position differ from one another, the end positions can be detected unambiguously by the at least one detector. The height position of the tool can be brought about in a simple way by way of detection of an end position and determination of the position of the tool starting from this end position, for example via further encoding elements.

A simple construction and precise detection of the height position including the detection of the end positions are achieved if two detectors are provided which are arranged at a predefined spacing from one another. By virtue of the fact that two detectors are provided, a simple configuration of the encoding elements is possible, for example via different lengths of the encoding elements in the circumferential direction. Encoding elements of different lengths can be detected in a simple way in a manner which is dependent on whether one detector or the two detectors detect(s) at least one encoding element.

In a simple embodiment, the encoding elements are formed by projections or the absence of projections. The gaps which are formed between the projections are detected by the at least one detector just like the projections. Simple encoding is possible by way of suitable arrangement of the projections and the gaps between the projections.

In a simple embodiment, the detector is an optical detector. Optical detectors are, in particular, laser light sources and suitable associated receivers. Other types of detectors, for example magnetic detectors such as Hall sensors which interact with magnets, mechanical switches, electric contacts, for example rubbing contacts and associated actuating elements, can also be advantageous, however. Here, the magnets, actuating elements or the like form the encoding elements.

In order to achieve precise positioning of the setting gear and detector, it is advantageously provided that the setting gear and the at least one detector are connected fixedly to a guide part of single-part configuration. The setting gear is advantageously mounted directly in the guide part. The detectors are advantageously fixed on a common component, the position of which with respect to the guide part can be set in order to compensate for tolerances. As a result, manufacturing tolerances between the setting gear and detectors are minimized in a simple way. As a result, a precise detection of the height position of the tool is made possible.

The setting unit advantageously includes a worm gear which is driven by the actuating motor. The worm gear can preferably be mounted on the guide part. Another arrangement of the worm gear can also be advantageous, however. The worm gear can preferably engage into the setting gear. Accordingly, the worm gear and setting gear form a single-stage transmission. In an alternative embodiment, a multiple-stage transmission can also be provided which transmits the rotational movement of the worm gear to the setting gear. In an embodiment, the setting gear is configured as a spur gear.

The drive motor is advantageously guided on the chassis via at least one, in particular via two linear guides. As a result, tilting of the drive motor with respect to the chassis is prevented. One linear guide preferably permits a movement of the drive motor with respect to the chassis transversely with respect to the longitudinal direction of the linear guide. Accordingly, this linear guide is configured as a floating bearing. The movement of the drive motor with respect to the chassis transversely with respect to the longitudinal direction of the linear guide can be provided, for example, in order to compensate for manufacturing tolerances or in order to compensate for length changes of the components under the influence of temperature. The other linear guide is preferably configured as a fixed bearing, and does not permit a movement of the drive motor with respect to the chassis transversely with respect to the longitudinal direction of the linear guide.

The drive motor is advantageously arranged in a motor mount. The motor mount can have, for example, a mount pot which is open towards the top and in which the drive motor is arranged. One simple embodiment arises if the motor mount has an elastic portion which is supported on the linear guide. The elastic portion is advantageously deformed transversely with respect to the longitudinal direction of the linear guide in the case of a movement of the motor mount with respect to the chassis. If the motor mount performs a movement with respect to the chassis transversely with respect to the longitudinal direction of the linear guide, the elastic portion absorbs this transverse movement by way of deformation. A movement of this type transversely with respect to the longitudinal direction of the linear guide can arise, for example, on account of length changes as a result of temperature changes. The elastic portion is configured, in particular, in one piece on the motor mount. The elastic portion is particularly advantageously formed by way of a correspondingly thin-walled configuration of regions of the motor mount. As a result, a simple construction with few individual parts is achieved. The linear guide is advantageously configured on the guide part.

The rotational axis of the setting gear preferably runs perpendicularly with respect to the adjusting direction of the setting unit. The setting gear is coupled, in particular at a spacing from its rotational axis, to the drive motor. On account of the coupling at a spacing from the rotational axis, an adjustment of the position of the drive motor and therefore of the position of the tool is possible via an eccentric pin or the like. As a result, a simple construction and an advantageous adjustment are achieved.

BRIEF DESCRIPTION OF THE DRAWINGS

The invention will now be described with reference to the drawings wherein:

FIG. 4 shows a side view of the arrangement from FIG. 3;

FIG. 5 shows a plan view in the direction of the arrow V in FIG. 4;

FIG. 6 shows a side view in the direction of the arrow VI in FIG. 5;

DESCRIPTION OF THE PREFERRED EMBODIMENTS

Figure 1:
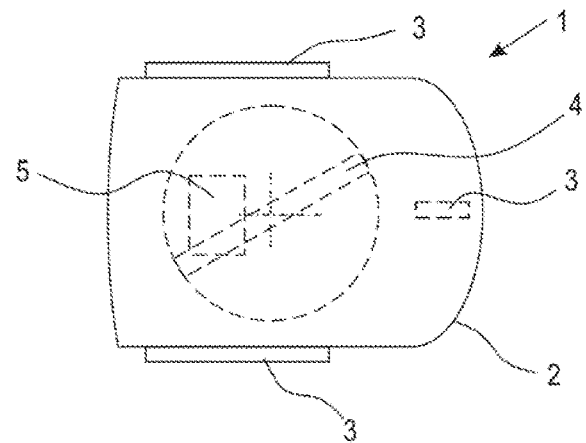
FIG. 1 shows a diagrammatic illustration of a self-propelled lawnmower in plan view.

FIG. 1 shows a lawnmower 1 in a diagrammatic illustration as an embodiment for a self-propelled work apparatus. The self-propelled work apparatus can also be a different work apparatus, however. The lawnmower 1 has a hood 2 which covers the tool of the lawnmower 1, a diagrammatically shown blade 4 in the embodiment. Moreover, the lawnmower 1 has a plurality of wheels 3, with which the lawnmower 1 can be moved over the ground.

Figure 2:
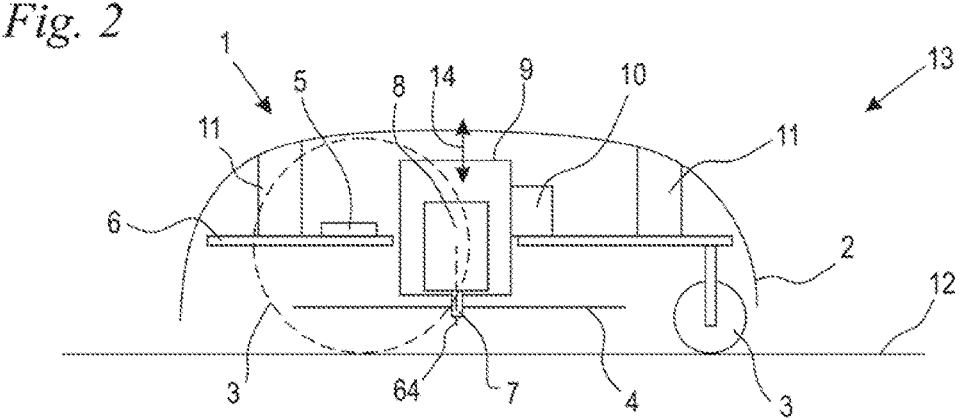
FIG. 2 shows a diagrammatic longitudinal section of the lawnmower from FIG. 1.

FIG. 2 shows a diagrammatic section through the lawnmower 1. The lawnmower 1 is situated in a storage position 13. In the storage position 13, the lawnmower 1 is stored on a flat, horizontal storage surface 12. Here, the wheels 3 of the lawnmower 1 are on the floor. In the embodiment, the lawnmower 1 has two rear, laterally arranged wheels 3 with a great diameter, and a front, centrally arranged, small wheel 3. In the embodiment, the front wheel 3 is arranged below the hood 2.

The lawnmower 1 has a chassis 6, on which the wheels 3 and the hood 2 are fixed. The hood 2 is supported via mounts 11 on the chassis 6. Here, the hood 2 is advantageously arranged such that it can be moved to a limited extent with respect to the chassis 6.

As FIG. 2 also shows, the blade 4 is arranged on a drive shaft 7 of a drive motor 8. The blade 4 is driven rotationally about a rotational axis 64 by the drive motor 8 during operation.

In the embodiment, the drive motor 8 is an electric motor. The drive motor 8 is arranged in a motor mount 9. The drive motor 8 is fixed on the motor mount 9 in such a way that the drive motor 8 can be moved with the motor mount 9 with respect to the chassis 6. The motor mount 9 can be adjusted with respect to the chassis 6 in a vertical direction 14 via a setting unit 10. The vertical direction 14 is the direction which runs vertically in the storage position 13. During the setting operation, the motor mount 9 moves at least partially in the vertical direction 14, with the result that setting of the height position of the blade 4 with respect to the ground is possible. Here, the adjusting direction can also be inclined with respect to the vertical direction 14. A controller 5 is provided in order to actuate the drive motor 8 and the setting unit 10. In the embodiment, the controller 5 is arranged on the chassis 6. An arrangement on the motor mount 9 can also be advantageous, however.

Figure 3:
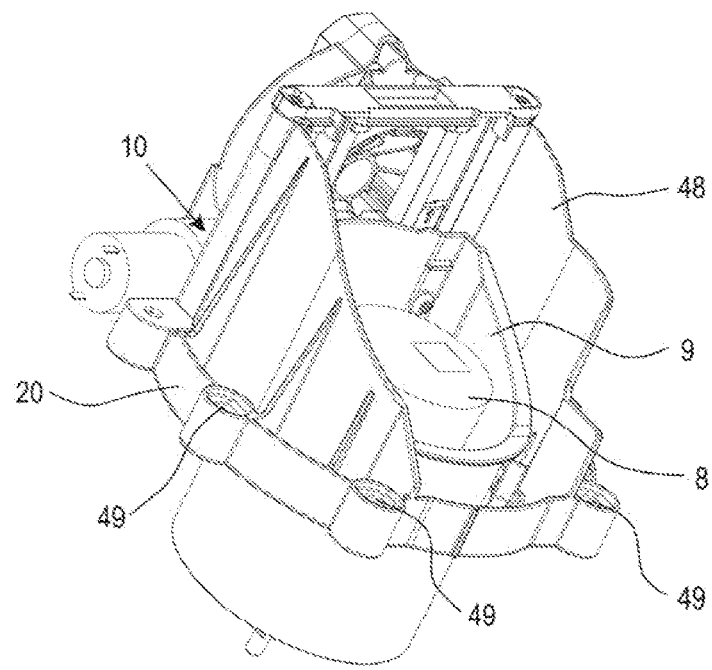
FIG. 3 shows a perspective illustration of the drive motor, motor mount and setting unit in a lower end position of the motor mount.

FIG. 3 perspectively shows the drive motor 8, the motor mount 9 and the setting unit 10. The setting unit 10 includes a guide part 20 which is connected fixedly to the chassis 6 (FIG. 2). In the embodiment, fastening openings 49 are provided in the base region of the guide part 20 to this end. In the embodiment, the guide part 20 includes a receiving portion 48, in which the motor mount 9 is arranged movably. The motor mount 9 can be moved in the vertical direction 14 which is shown in FIG. 4.

Figure 7:
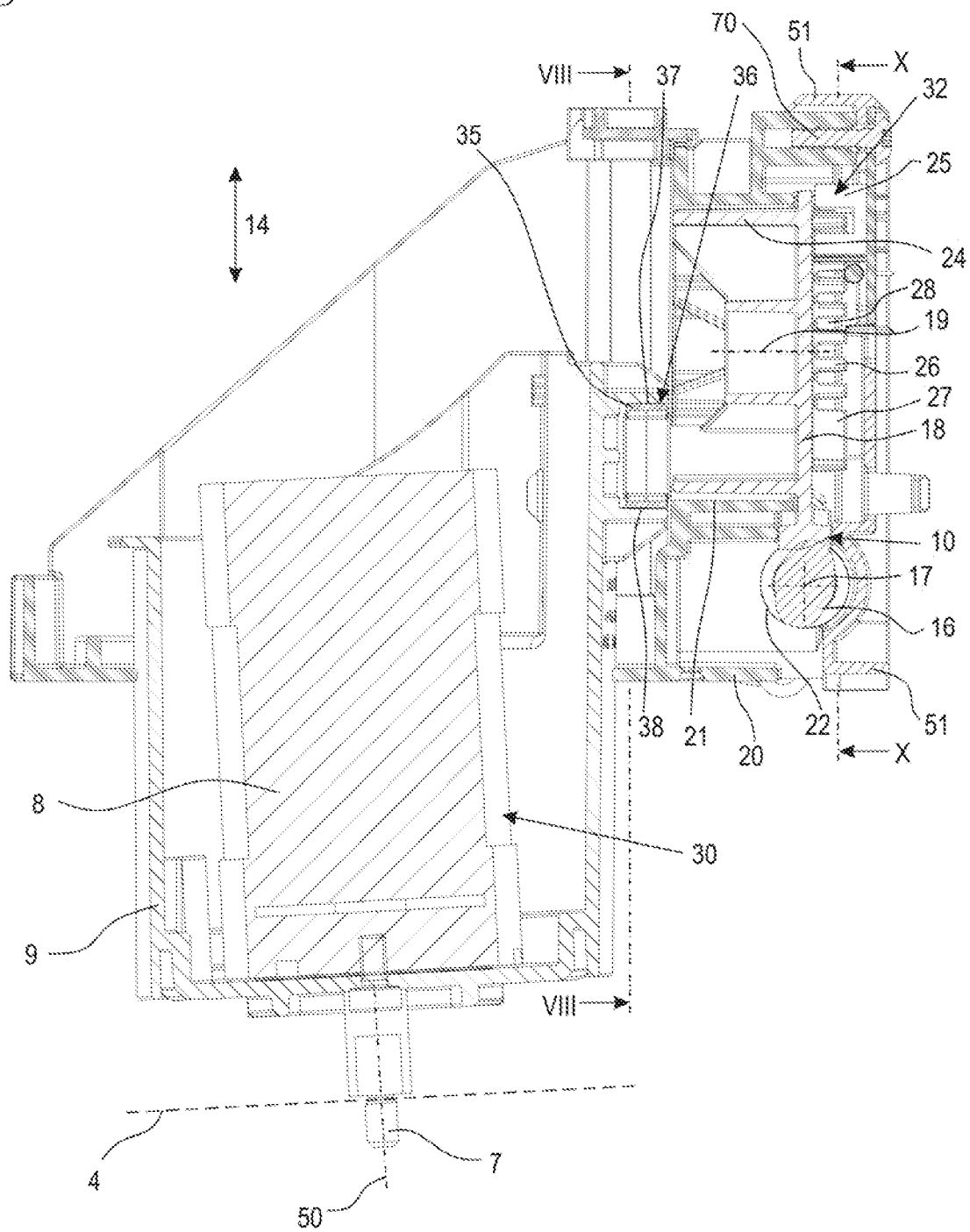
FIG. 7 shows a section along the line VII-VII in FIG. 6.

FIGS. 3 to 10 show the motor mount 9 and the drive motor 8 in a first, lower end position 30. As FIGS. 4 to 6 show, the setting unit 10 is arranged on the guide part 20 on one side of the motor mount 9. The setting unit 10 includes an actuating motor 15. The actuating motor 15 drives a worm gear 16 which is shown in FIG. 7. In the embodiment, the rotational axis 17 of the worm gear 16 is arranged perpendicularly with respect to the rotational axis 50 of the drive motor 8. The rotational axis 50 of the drive motor 8 coincides with the rotational axis 64 of the blade 4. In the storage position 13 (FIG. 2), the rotational axis 17 of the worm gear 16 lies horizontally.

The setting unit 10 includes a setting gear 18 which is mounted such that it can be rotated about a rotational axis 19. In the embodiment, the rotational axis 19 is arranged perpendicularly with respect to the rotational axis 17 of the worm gear 16. The rotational axis 19 lies horizontally in the storage position 13. In the embodiment, the setting gear 18 is mounted on the guide part 20. The setting gear 18 has a bearing support 24 which is mounted rotatably on a bearing surface 21 of the guide part 20. The bearing surface 21 is advantageously of cylindrical configuration, and the bearing support 24 has outwardly protruding ribs for bearing against the bearing surface 21. The actuating motor 15 and the worm gear 16 are also mounted on the guide part 20. In the embodiment, the worm gear 16 engages directly into the setting gear 18. In one alternative embodiment, further transmission stages can also be provided.

The setting gear 18 supports an eccentric pin 34 (FIG. 8) on its side which faces the motor mount 9. The eccentric pin 34 supports a sliding element 35 which will be described in greater detail in the following text. The sliding element 35 is mounted rotatably on the eccentric pin 34. The motor mount 9 has two guide surfaces 37 and 38, between which the eccentric pin 34 with the sliding element 35 is arranged. The guide surfaces 37 and 38 form a guide 36 with the sliding element 35. In the storage position 13, the guide 36 is oriented horizontally. A different orientation of the guide 36 can also be advantageous, however. In the case of a rotation of the setting gear 18, the eccentric pin 34 moves in the vertical direction 14 and, as a result, brings about a movement of the guide part 20 in the vertical direction 14. The movement of the eccentric pin in the horizontal direction, that is, perpendicularly with respect to the vertical direction 14, which is caused by the rotation of the setting gear 18 brings about a displacement of the sliding element 35 with respect to the guide surfaces 37 and 38. In the case of the rotational movement of the setting gear 18, the eccentric pin 34 rotates in the sliding element 35.

Figure 10:
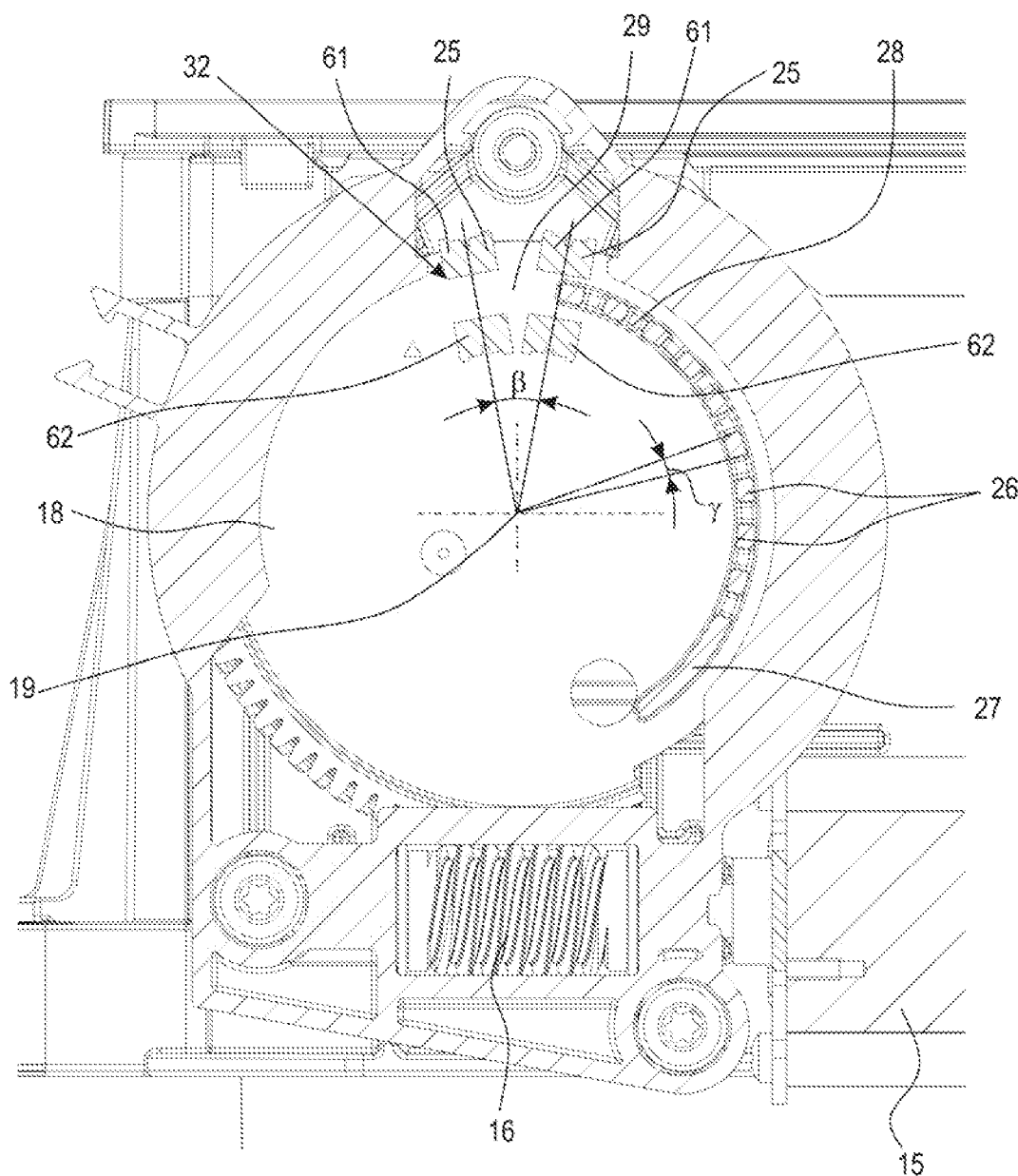
FIG. 10 shows a section along the line X-X in FIG. 7.

In order for it to be possible for the height position of the motor mount 9 and therefore the height position of the blade 4 to be detected, a detection device 32 is provided. The detection device 32 includes at least one detector 25. In the embodiment, two detector 25 are provided, as FIG. 10 shows. The detectors 25 are configured to detect encoding elements 26, 27, 28, 29 when they move past the at least one detector 25. In the embodiment, the detectors 25 are configured as optical detectors, for example light barriers with laser light. The encoding elements 26 and 27 are formed by projections on the setting gear 18. The encoding elements 28 and 29 are formed by missing projections. The encoding element 29 is shown in FIG. 10. As FIG. 10 also shows, the encoding elements 26 to 29 are arranged on a circular path around the rotational axis 19. In the case of the rotational movement of the setting gear 18, the encoding elements 26 to 29 move past the detectors 25 and are detected. As a result, the rotational position of the setting gear 18 and therefore the height position of the guide part 20, the drive motor 8 and the blade 4 can be determined.

As FIG. 7 shows, the worm gear 16 is mounted in a bearing surface 22 of the guide part 20. The bearing surface 22 is preferably configured as a hollow cylinder. As FIG. 7 also shows, all the elements of the setting unit 10 apart from the controller 5 (FIG. 2) and the detectors 25 are mounted directly on the guide part 20. The guide part 20 is closed by a cover 51. In the embodiment, the detectors 25 are held on the cover 51. The cover 51 is fixed on the guide part 20 via at least one screw 70 in the embodiment. The screw 70 is guided with a small amount of play in the cover 51, with the result that, in the case of the positioning of the cover 51 on the guide part 20, a compensation of small tolerances is possible. A different arrangement of the detector 25, in particular on the guide part 20, can also be advantageous, however.

Figure 8:
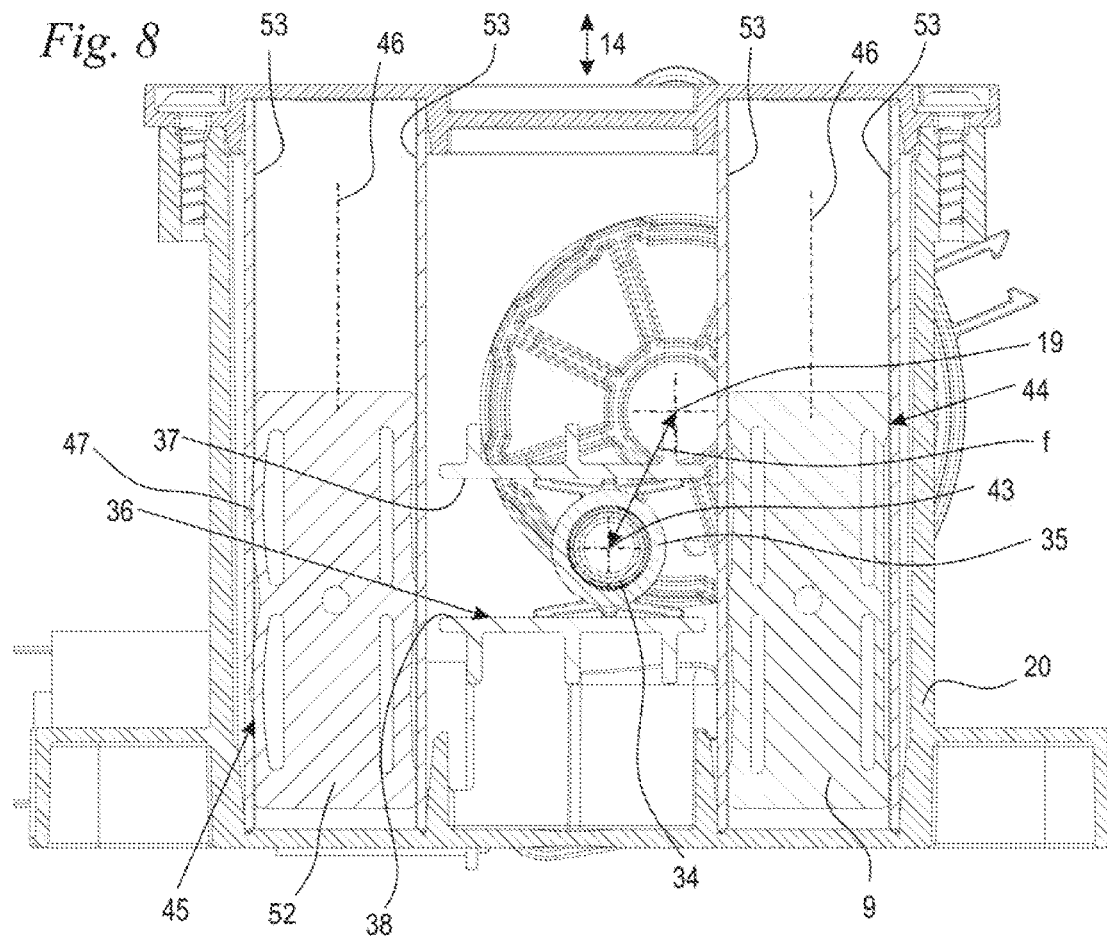
FIG. 8 shows a section along the line VIII-VIII in FIG. 7.

FIG. 8 shows the mounting of the motor mount 9 on the guide part 20. The motor mount 9 and the guide part 20 form two linear guides 44 and 45. The longitudinal direction 46 of the linear guides 44 and 45 is oriented in the vertical direction 14 in the storage position 13. The linear guides 44 and 45 in each case have a guide piece 52 which protrudes between the sliding tracks 53 of each linear guide 44, 45 which lie opposite one another and is guided between them. In the embodiment, the first linear guide 44 is configured as a fixed bearing, and the second linear guide 45 is configured as a floating bearing. The first linear guide 44 does not permit any movement of the motor mount 9 with respect to the guide part 20 in the direction perpendicularly with respect to the longitudinal direction 46. The guide piece 52 is advantageously guided without play between the sliding tracks 53 within the context of the manufacturing tolerances. In order to compensate for tolerances and length changes, the second linear guide 45 has elastic portions 47, on which the guide piece 52 of the motor mount 9 which protrudes between the sliding tracks 53 of the linear guide 45 which lie opposite one another can be deformed. As a result, the elastic portions 47 permit a relative movement of the guide part 20 with respect to the sliding tracks 53 perpendicularly with respect to the longitudinal direction 46.

Figure 9:
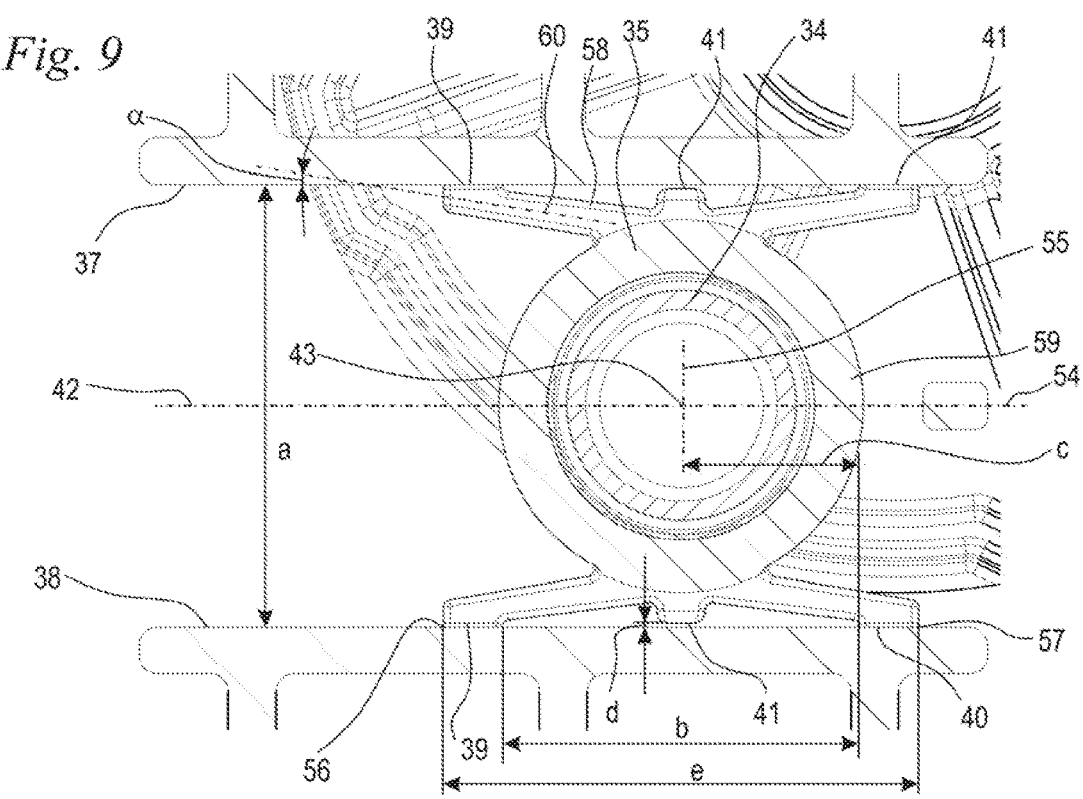
FIG. 9 shows the region of the sliding element and the guide from FIG. 8 in an enlarged illustration.

FIGS. 8 and 9 also show the eccentric pin 34 with the sliding element 35 and the guide 36. As FIG. 8 shows, the eccentric pin 34 is configured as a hollow pin in the embodiment. As FIG. 9 shows, the eccentric pin 34 has a center axis 43. As FIG. 8 shows, the rotational axis 19 of the setting gear 18 is at a spacing f from the center axis 43 of the eccentric pin 34. The distance covered by the blade 4 between the upper end position 31 and the lower end position 30 is advantageously less than twice the spacing f, in particular less than 1.8 times the spacing f.

In the embodiment, the sliding element 35 is of mirror-symmetrical configuration with respect to a first plane of symmetry 54 which lies between the guides 37 and 38. The first plane of symmetry 54 is oriented in the longitudinal direction 42 of the guide 36. In the embodiment, the sliding element 35 is, moreover, of symmetrical configuration with respect to a second plane of symmetry 55 which runs perpendicularly with respect to the first plane of symmetry 54 and through the center axis 43. The sliding element 35 has at least one sliding surface 39, 40. The sliding element 35 bears by way of the at least one sliding surface 39, 40 against at least one guide surface 37, 38. In the embodiment, two sliding surfaces 39, 40 are provided on each guide surface 37 and 38. The sliding surfaces 39 have an outer side 56 which lies at a spacing from the other sliding surface 40 which bears against this guide surface 37, 38. The sliding surfaces 40 have an outer side 57 which lies at a spacing from the other sliding surface 39. The outer sides 56, 57 are at a spacing e from one another. The guide surfaces 37 and 38 are oriented parallel to one another and are at a spacing a from one another. The spacing a can be, for example, a few centimetres. The spacing e is advantageously at least 50%, in particular at least 80%, of the spacing a of the guide surfaces 37 and 38. As a result, tilting or canting of the sliding element 35 between the guide surfaces 37 and 38 is prevented.

The sliding element 35 has a hub 59 which surrounds the eccentric pin 34. In the embodiment, a plain bearing is formed between the hub 59 and the eccentric pin 34. In each case two arms 58 extend from the hub 59 in the direction of each guide surface 37 and 38. The arms 58 are of elastic configuration, with the result that the sliding surfaces 39 and 40 bear in an elastically prestressed manner against the guide surfaces 37 and 38. The arms 58 have a center axis 60 which runs very flatly with respect to the guide surfaces 37 and 38. The center axis 60 advantageously encloses an angle α of less than 30°, in particular of less than 20°, with an associated guide surface 37, 38.

The sliding surfaces 39 and 40 are advantageously at a spacing b which is measured parallel to the guide surfaces 37 and 38. The spacing b of the two sliding surfaces 39 and 40 is advantageously at least 30%, in particular at least 50%, of the spacing a of the guide surfaces 37 and 38.

In order to ensure that the arms 58 cannot be overloaded, at least one stop 41 is provided which limits the deformation of an arm 58. A stop 41 is advantageously provided adjacently with respect to each arm 58. In the embodiment, a stop 41 which protrudes between two sliding surfaces 39 and 40 is provided on each guide surface 37 and 38. In the unloaded state which is shown in FIG. 9, the stop 41 is at a spacing d from the associated guide surface 37, 38. If the worm gear 16 is rotated and the eccentric pin 34 is moved as a result, the stop 41 which lies at the front in the movement direction of the eccentric pin 34 can bear against the associated guide surface 37, 38 and thus ensure a satisfactory transmission of the actuating movement. The stop 41 is arranged between the sliding surfaces 39 and 40. The sliding surfaces 39 and 40 are at a spacing c, measured parallel to the guide surfaces 37 and 38, from the center axis 43 of the eccentric pin 34. In the embodiment, the spacing c is greater than the radius of the eccentric pin 34. In the embodiment, all the sliding surfaces 39, 40 of the sliding element 35 are at the same spacing, measured in the longitudinal direction 42 of the guide 36, from the center axis 43 of the eccentric pin 34.

FIG. 10 shows the detection device 32 in detail. The setting gear 18 supports the encoding elements 26 to 29 which are arranged in a circular manner around the rotational axis 19. The encoding elements 26 and 27 are configured as projections. Each detector 25 has a transmitter 61 and a receiver 62. The arrangement of the transmitters 61 and receivers 62 can also be swapped. In the embodiment, the detectors 25 are optical detectors, and the transmitters 61 emit light, in particular laser light, and the receivers 62 receive the light and evaluate the received light intensity. If a projection of an encoding element 26 or 27 passes between the transmitter 61 and receiver 62 of a detector 25, the receiver 62 is concealed and the signal which is received from the transmitter 61 is attenuated. In the embodiment, the detectors 25 are optical detectors. The detectors 25 can also be other types of detectors 25, however, for example magnetic detectors 25 such as Hall sensors which interact with magnets which form the encoding elements, mechanical switches or electrical contacts, for example rubbing contacts or the like.

The two detectors 25 are arranged at an angular spacing β from one another. The angular spacing β is greater than the circumferential angle, over which an encoding element 26 or 28 extends. Here, the angular spacing β is measured between the center axes of the detectors 25. The encoding elements 28 are formed by a missing projection, that is, the gap between two encoding elements 26 which follow one another. The encoding elements 26 and 28 extend in each case over an angle γ which can be, for example, 1.5 times the angular spacing β. The angular spacing β and the angle γ are preferably adapted to one another in such a way that only one of the detectors 25 is concealed by an encoding element 26 in each position in a region between the end positions 30 (FIG. 7) and 31 (FIG. 14) of the blade 4.

In that lower end position 30 (FIG. 4) of the blade 4 and the motor mount 9 which is shown in FIGS. 3 to 10, an encoding element 29 is arranged in the region of one of the detectors 25. The encoding element 29 extends over an angular spacing which corresponds at least to the angle β. In the embodiment, the encoding element 29 is a missing projection. If the two receivers 62 of the detector 25 receive a signal which is not attenuated, the motor mount 9 is therefore situated in its first, lower end position 30.

Figure 11:
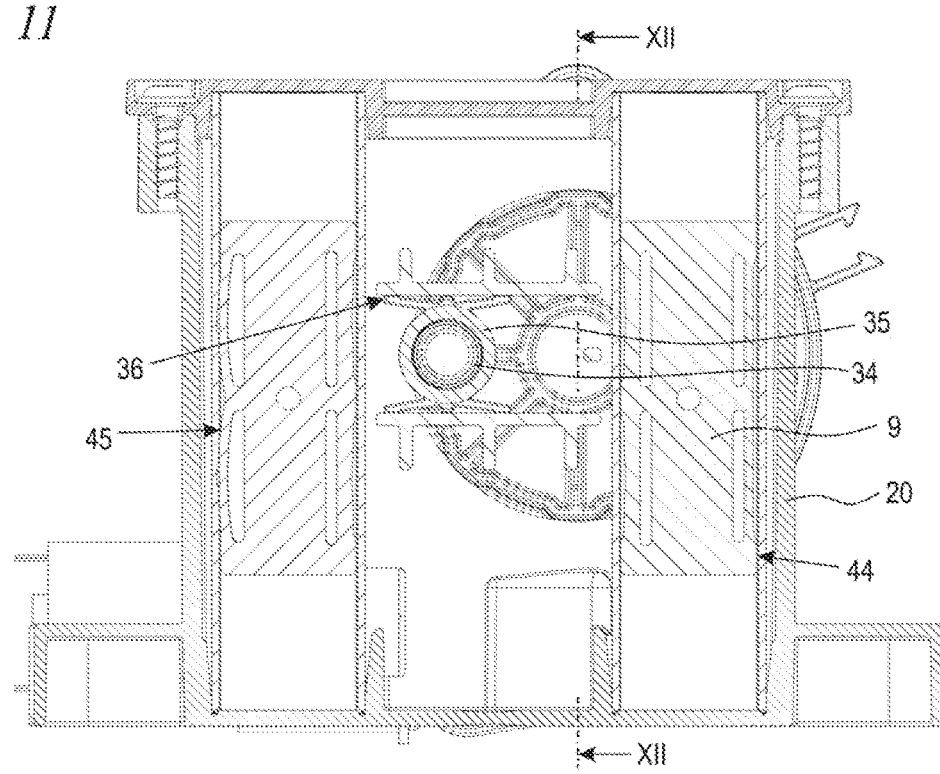
FIG. 11 shows a sectional illustration in accordance with FIG. 8 in a middle position of the motor mount.
Figure 12:
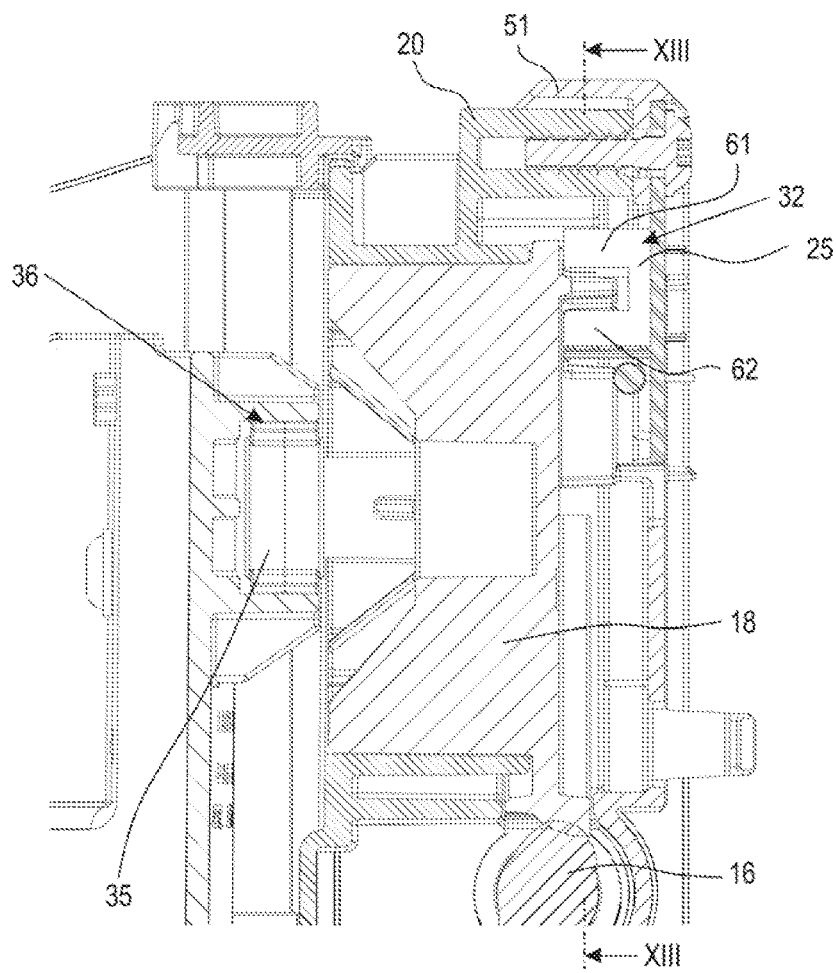
FIG. 12 shows a section along the line XII-XII in FIG. 11.
Figure 13:
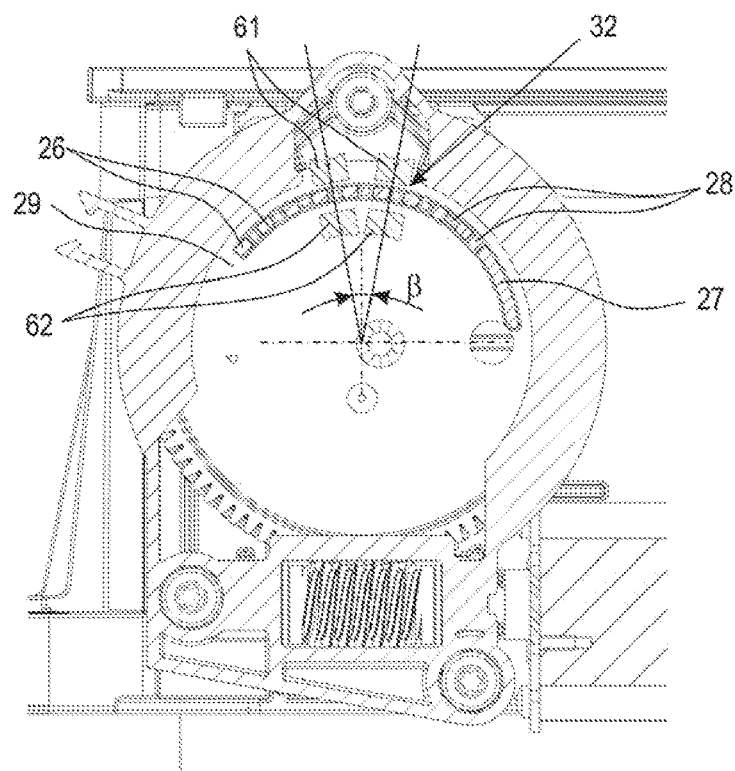
FIG. 13 shows a section along the line XIII-XIII in FIG. 12.

If the motor mount 9 moves out of the lower end position 30 in the direction of its upper end position 31 (FIGS. 14 to 16), the encoding elements 26 and 27 move past the detector 25. The receivers 62 are concealed partially by the encoding elements 26 in every position, with the result that the received signal is weaker than in the first, lower end position 30. The changing signal strength can be evaluated by the controller 5. The position of the motor mount 9 can be determined, starting from one end position 30, 31, by counting the encoding elements 26 and 27 which are guided past the detector 25. On account of the eccentric pin 34 which changes in a non-linear manner in the vertical direction 14 with respect to the adjusting angle of the setting gear 18, a non-linear relationship arises between the number of encoding elements 26, 27 which are guided past the detector 25 and the distance which is covered by the motor mount 9 and the blade 4. This is to be taken into consideration in the evaluation. FIGS. 11 to 13 show the arrangement in a middle position of the motor mount 9 and the blade 4. The eccentric pin 34 has moved from the lower end position 30 to the middle position with respect to the guide surfaces 37 and 38, from one to its other horizontal end position. The eccentric pin 34 moves from the middle position to the upper end position 31 back again into its starting position. The sliding element 35 is preferably situated in the first end position 30 and the second end position 31 relative to the guide surfaces 37 and 38 in the same position.

Figure 14:
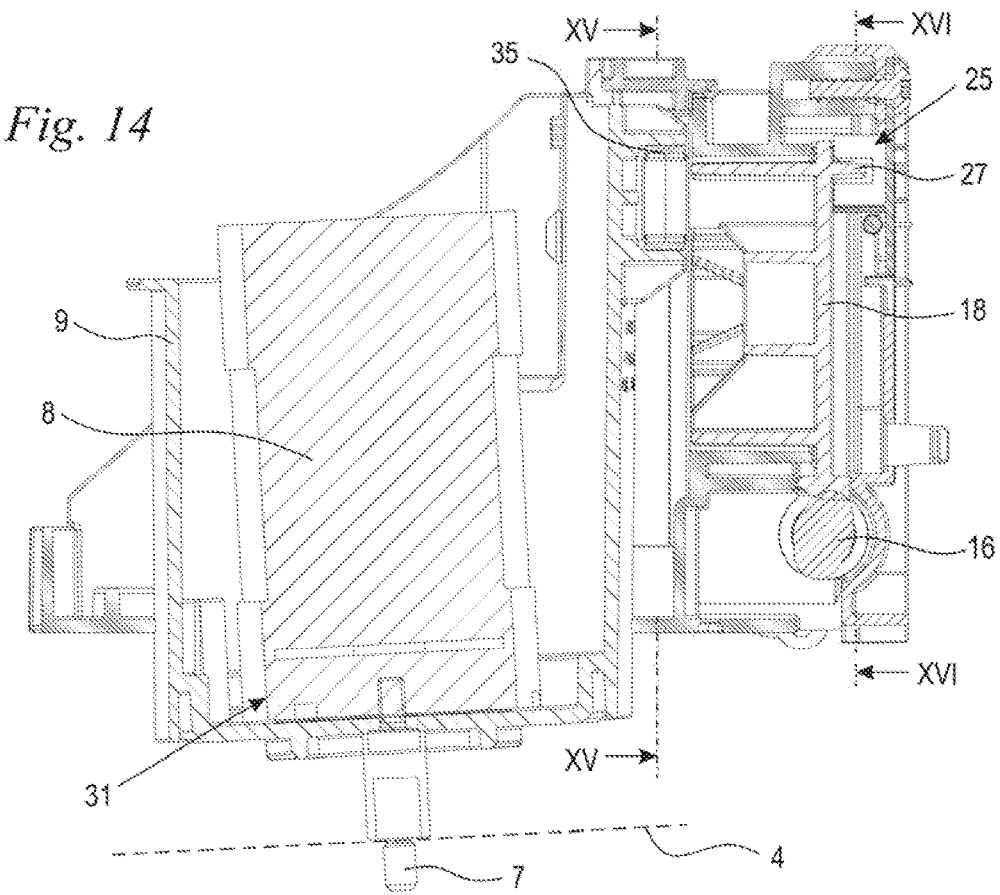
FIG. 14 shows a sectional illustration in accordance with FIG. 8 in an uppermost end position of the motor mount.
Figure 15:
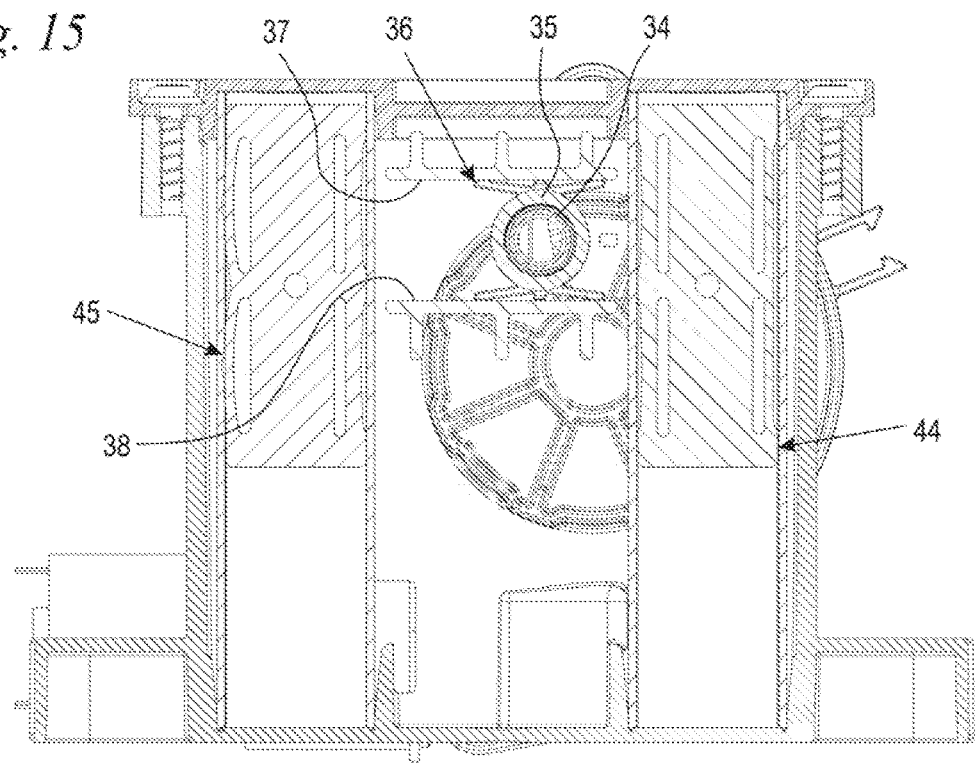
FIG. 15 shows a section along the line XV-XV in FIG. 14.
Figure 16:
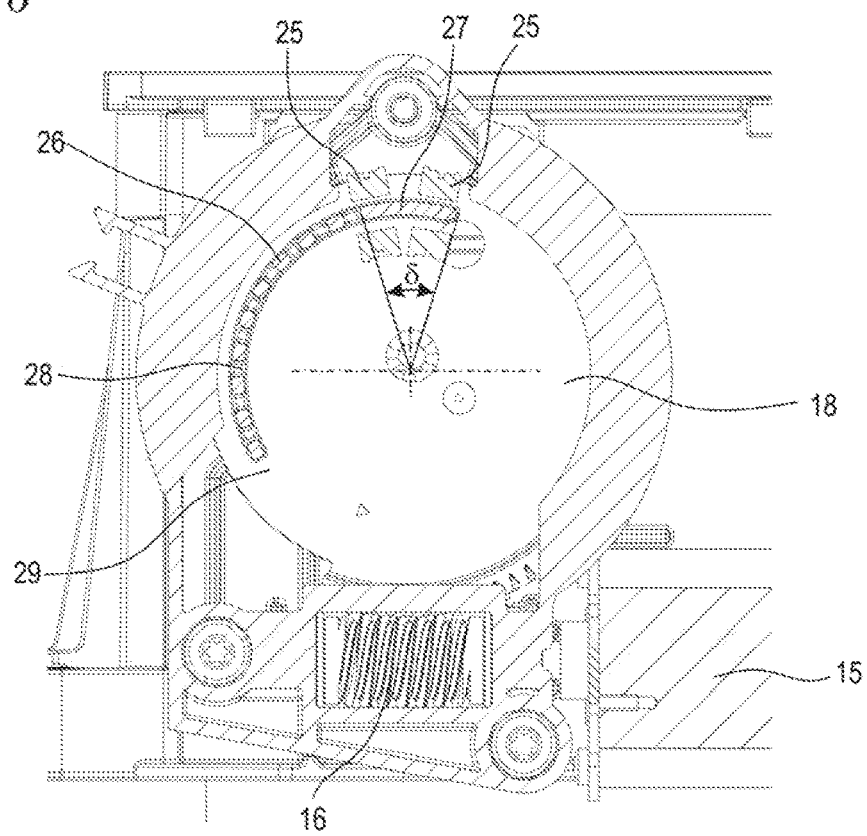
FIG. 16 shows a section along the line XVI-XVI in FIG. 14.

FIG. 14 shows the motor mount 9 in its second, upper end position 31. In this position, an encoding element 27 is arranged in the region of the detector 25. The encoding element 27 for the second, upper end position 31 differs from the encoding element 29 for the first, lower end position 30. The encoding elements 27 and 29 also differ from the encoding elements 26 and 28 for positions between the end positions 30 and 31. FIG. 16 shows the arrangement of the encoding element 27 in the region of the detector 25. As FIG. 16 shows, the two receivers 62 of the detector 25 are concealed at least partially by the encoding element 27. As a result, the second, upper end position 31 is unambiguously identifiable for the controller 5. In the case of the movement of the motor mount 9 from the lower end position 30 to the upper end position 31, the sliding element 35 has moved in the direction of the second linear guide 44 and back.

It is understood that the foregoing description is that of the preferred embodiments of the invention and that various changes and modifications may be made thereto without departing from the spirit and scope of the invention as defined in the appended claims.

What is claimed is:

1. A self-propelled work apparatus comprising:
a chassis;
at least one tool being adjustable in elevation relative to said chassis between a first lower end position and a second upper end position;
a drive motor for driving said tool;
a setting unit for setting said tool in elevation relative to said chassis;
said setting unit including an actuating motor and a setting gear;
said setting gear being rotatable less than one full rotation between said first lower end position of said tool and said second upper end position of said tool;
a detection unit for detecting the position in elevation of said tool;
said detection unit including encoding elements on said setting gear and at least one detector; and,
at least a first one of said encoding elements being provided for said first lower end position and differing from at least a second one of said encoding elements being provided for said second upper end position.

2. The work apparatus of claim 1, wherein said at least one detector is a first detector and said detection unit further includes a second detector; and, said first and second detectors are arranged at a predetermined spacing from one another.

3. The work apparatus of claim 1, wherein said encoding elements are defined by projections and by an absence of projections.

4. The work apparatus of claim 1, wherein said at least one detector is an optical detector.

5. The work apparatus of claim 1, further comprising:
a guide part configured as one part; and,
said setting gear and said at least one detector being securely connected to said guide part.

6. The work apparatus of claim 1, wherein said setting unit includes a worm gear driven by said actuating motor.

7. The work apparatus of claim 6, further comprising:
a guide part configured as one part; and,
wherein said worm gear is mounted on said guide part.

8. The work apparatus of claim 6, wherein said worm gear engages said setting gear.

9. The work apparatus of claim 1, wherein said setting gear is configured as a spur gear.

10. The work apparatus of claim 1, further comprising:
at least one linear guide; and,
said drive motor being guided on said chassis via said at least one linear guide.

11. The work apparatus of claim 10, wherein said at least one linear guide defines a longitudinal direction; and, said at least one linear guide is configured to permit a movement of said drive motor with respect to said chassis transversely with respect to said longitudinal direction of said at least one linear guide.

12. The work apparatus of claim 11, further comprising:
a motor mount accommodating said drive motor therein; and,
said motor mount having an elastic portion supported on said at least one linear guide.

13. The work apparatus of claim 10, further comprising:
a guide part configured as one part; and,
said at least one linear guide being configured on said guide part.

14. The work apparatus of claim 1, further comprising:
two linear guides; and,
said drive motor being guided on said chassis via said two linear guides.

15. The work apparatus of claim 1, wherein:
said setting unit defines an adjusting direction;
said setting gear defines a rotational axis running perpendicularly with respect to said adjusting direction of said setting unit; and,
said setting gear is coupled to said drive motor at a spacing from said rotational axis of said setting gear.

16. The work apparatus of claim 1, wherein said work apparatus is a lawnmower.

* * * * *